(No Model.)
N. W HOLT.
ROLLER MILL.
No. 260,979. Patented July 11, 1882.
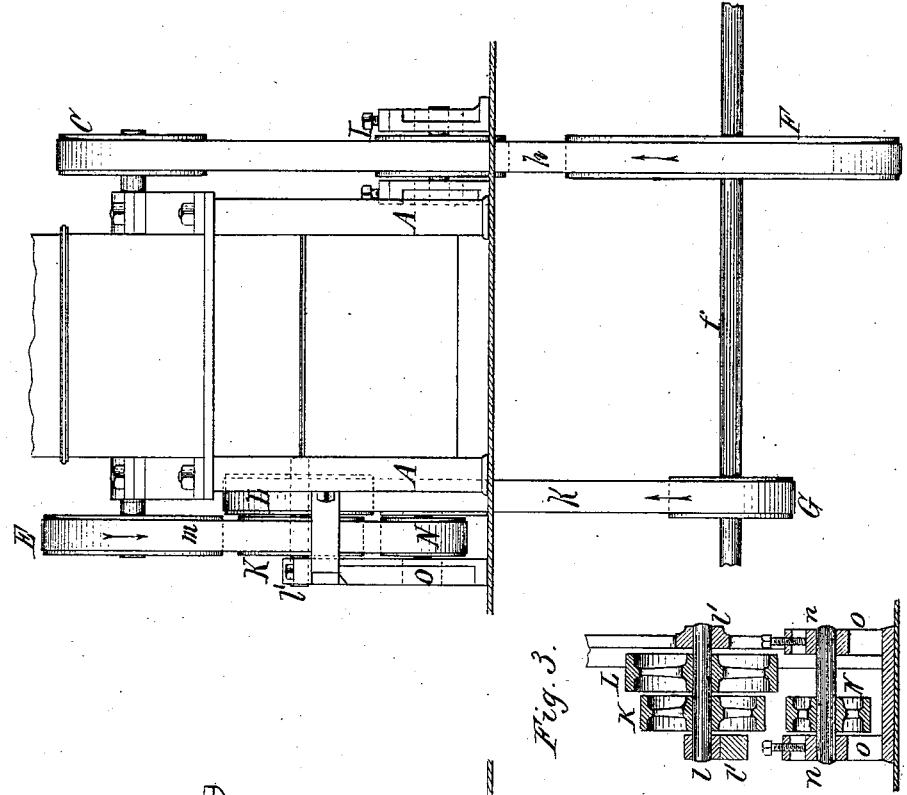
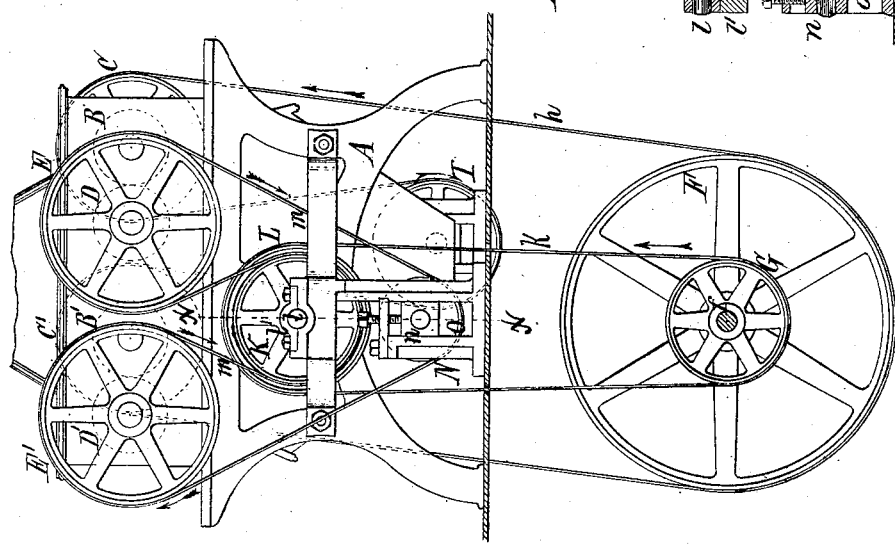
Witnesses:
Edw. J. Brady
Theo. L. Popp
Noah W. Holt, Inventor.
By Wilhelm Bonner
Attorneys.

UNITED STATES PATENT OFFICE.

NOAH W. HOLT, OF BUFFALO, NEW YORK, ASSIGNOR TO RICHARD K. NOYE, OF SAME PLACE.

ROLLER-MILL.

SPECIFICATION forming part of Letters Patent No. 260,979, dated July 11, 1882.

Application filed April 4, 1882. (No model.)

*To all whom it may concern:*

Be it known that I, NOAH W. HOLT, of the city of Buffalo, in the county of Erie and State of New York, have invented a new and useful Improvement in Roller-Mills, of which the following is a specification.

This invention relates more particularly to that class of roller-mills for grinding grain and similar material in which two pairs of rollers are employed in the same machine; and it has for its object to simplify the mechanism whereby the rollers are rotated. Two of the rollers revolve in a direction opposite to that in which the other two rollers revolve, and in order to drive all of the rollers by endless belts, which is more desirable than the employment of gear-wheels, it has been customary to drive two of the rollers either by means of a crossed belt or by a straight belt and a counter-shaft extending across the machine. In my improved driving mechanism all of the rollers are driven by straight or open belts without the employment of a counter-shaft extending across the machine.

My invention consists of the peculiar construction of the driving mechanism, as hereinafter fully set forth.

In the accompanying drawings, Figure 1 is an elevation of the rear side of a roller-mill provided with my improvement. Fig. 2 is an end elevation thereof. Fig. 3 is a cross-section in line $x\ x$, Fig. 1.

Like letters of reference refer to like parts in the several figures.

A A represent the side frame of the roller-mill, B B' the fast rollers, C C' the pulleys mounted on the shafts thereof, D D' the slow rollers, and E E' the pulleys mounted on the shafts thereof, all of any well-known or suitable construction.

$f$ represents the horizontal driving-shaft, arranged underneath the roller-mill; F, a large pulley mounted thereon for driving the fast rollers B B', and G a small pulley secured to the shaft $f$, for driving the slow rollers D D'.

$h$ represents an endless belt, which communicates motion from the pulley F to the pulleys C C' of the fast rollers, and which runs from the pulley F upward, as indicated by the arrow, to and around the pulley C, thence downward around a tightener or jack pulley, I, which is arranged near the base of the machine, thence upward and around the pulley C', and thence downward and back to the pulley F, as clearly indicated by dotted lines in Fig. 1.

$k$ represents a straight or open belt running around the pulley G on the driving-shaft $f$ and around a pulley, L, arranged on the rear side of the machine below the pulleys E E'. This pulley L is mounted on a short shaft, $l$, supported in bearings $l'$, attached to the side frame of the machine.

K is a similar pulley secured to the shaft $l$ on the outer side of the pulley L, and arranged in the same vertical plane with the pulleys E E'.

$m$ is an endless belt running around the pulley K, thence upward and around the pulley E, thence downward and around a tightener-pulley, N, thence upward and around the pulley E', and thence downward to the pulley K. The tightener-pulley N turns with its journals in bearings $n$, which are made vertically adjustable between guides or ways O; or, if preferred, the pulley N may turn on a loose arbor.

The belt $h$ drives the fast rollers B B', and the belt $m$ the slow rollers D D'. Motion is imparted to the belt $m$ by the belt $k$ and pulleys K L in such manner that the pulleys E E' of the slow rollers rotate in an opposite direction to the pulleys C C' of the fast rollers. The two sets of rollers are thereby rotated in opposite directions by means of straight or open belts, and without employing a counter-shaft extending across the machine.

If preferred, the pulleys K and L may be cast in one piece, and be secured to the same shaft or turn loosely on a fixed arbor.

I claim as my invention—

1. The combination, with the rollers D D', provided with pulleys E E', of a tightener-pulley, N, a pulley, K, an open endless belt, $m$, passing around the pulleys E, E', N, and K, and a pulley, L, secured to the pulley K, and adapted to receive the driving-belt k, substantially as set forth.

2. The combination, with the fast rollers B B', provided with pulleys C C', the slow rollers D D', provided with pulleys E E', and the driving-shaft f, provided with pulleys F G, of the jack-pulley I, and an open endless belt, h, running around the pulleys C, C', F, and I, pulleys K, L, and N, an open endless belt, k, running around the pulleys G and L, and an open endless belt, m, running around the pulleys E, E', K, and N, substantially as set forth.

NOAH W. HOLT.

Witnesses:
JNO. J. BONNER,
THEO. L. POPP.